United States Patent
Asano et al.

(10) Patent No.: US 11,912,149 B2
(45) Date of Patent: Feb. 27, 2024

(54) MISALIGNMENT DETECTION DEVICE AND COIL DEVICE

(71) Applicant: IHI Corporation, Tokyo (JP)

(72) Inventors: Atsushi Asano, Tokyo (JP); Takayoshi Bando, Tokyo (JP)

(73) Assignee: IHI CORPORATION, Tokyo (JP)

( * ) Notice: Subject to any disclaimer, the term of this patent is extended or adjusted under 35 U.S.C. 154(b) by 526 days.

(21) Appl. No.: 17/269,565

(22) PCT Filed: Jul. 16, 2019

(86) PCT No.: PCT/JP2019/027976
§ 371 (c)(1),
(2) Date: Feb. 19, 2021

(87) PCT Pub. No.: WO2020/070945
PCT Pub. Date: Apr. 9, 2020

(65) Prior Publication Data
US 2021/0323428 A1     Oct. 21, 2021

(30) Foreign Application Priority Data

Oct. 5, 2018   (JP) ................................ 2018-189910

(51) Int. Cl.
| | |
|---|---|
| *B60L 53/37* | (2019.01) |
| *G01B 21/24* | (2006.01) |
| *H01F 38/14* | (2006.01) |
| *H02J 7/02* | (2016.01) |

(Continued)

(52) U.S. Cl.
CPC .............. *B60L 53/37* (2019.02); *G01B 21/24* (2013.01); *H01F 38/14* (2013.01); *H02J 7/02* (2013.01); *H02J 50/10* (2016.02); *H02J 50/90* (2016.02)

(58) Field of Classification Search
CPC .......... B60L 53/37; H02J 50/90; H02J 50/10; G01B 21/24
See application file for complete search history.

(56) References Cited

U.S. PATENT DOCUMENTS

| | | |
|---|---|---|
| 2012/0323423 A1 | 12/2012 | Nakamura et al. |
| 2013/0249299 A1 | 9/2013 | Shijo et al. |
| 2015/0357828 A1 | 12/2015 | Ichikawa et al. |

(Continued)

FOREIGN PATENT DOCUMENTS

| | | | | |
|---|---|---|---|---|
| CN | 111038294 A | * | 4/2020 | ................ B60L 3/00 |
| JP | 2008-017562 A | | 1/2008 | |

(Continued)

*Primary Examiner* — Mirellys Jagan
(74) *Attorney, Agent, or Firm* — Volpe Koenig (57) ABSTRACT

This misalignment detection device is provided with: a plurality of coils which receive lines of magnetic force generated by a power transmitting coil and are disposed side by side line-symmetrically with respect to an axis line as a symmetrical axis; a plurality of temperature sensors which are disposed adjacent to each of the plurality of coils and output temperatures; and a processing device for detecting misalignment of a power receiving coil with respect to the power transmitting coil along the axis line on the basis of a difference for evaluating a difference between the temperatures. With this misalignment detection device, it is possible to perform positional misalignment detection which is not easily affected by surroundings.

6 Claims, 10 Drawing Sheets

(51) Int. Cl.
*H02J 50/10* (2016.01)
*H02J 50/90* (2016.01)

(56) References Cited

U.S. PATENT DOCUMENTS

| | | | |
|---|---|---|---|
| 2016/0134129 A1 | | 5/2016 | Watanabe et al. |
| 2016/0250935 A1 | | 9/2016 | Yuasa |
| 2017/0170690 A1 | | 6/2017 | Shijo et al. |
| 2017/0361724 A1 | * | 12/2017 | Seong .................... B60L 53/38 |

FOREIGN PATENT DOCUMENTS

| | | | | |
|---|---|---|---|---|
| JP | 2010-080770 | A | 4/2010 | |
| JP | 2010-226945 | A | 10/2010 | |
| JP | 2012-080770 | A | 4/2012 | |
| JP | 2015-008605 | A | 1/2015 | |
| JP | 2015-100230 | A | 5/2015 | |
| JP | 5749208 | B2 | 7/2015 | |
| JP | 2016-103926 | A | 6/2016 | |
| JP | 2016-163405 | A | 9/2016 | |
| JP | 6176272 | B | 8/2017 | |
| JP | 6330637 | B | 5/2018 | |
| WO | WO-2016162940 A1 | * | 10/2016 | ................ B60L 3/00 |
| WO | 2017/145603 A1 | | 8/2017 | |

\* cited by examiner

MISALIGNMENT DETECTION DEVICE AND COIL DEVICE

TECHNICAL FIELD

The present disclosure relates to a misalignment detection device and a coil device.

BACKGROUND ART

In a wireless power supply device using a coil, positional misalignment of another coil with respect to one coil affects performance of the wireless power supply device. For example, Patent Literatures 1 to 3 disclose techniques relating to positional misalignments of coils. Specifically, the techniques of Patent Literatures 1 to 3 reduce positional misalignment between coils by providing guidance information to vehicles. For example, in Patent Literature 1, occurrence of misalignment between coils is inhibited by using an image obtained by a camera.

CITATION LIST

Patent Literature

[Patent Literature 1] Japanese Unexamined Patent Publication No. 2010-226945
[Patent Literature 2] Japanese Unexamined Patent Publication No. 2012-080770
[Patent Literature 3] Japanese Patent No. 5749208

SUMMARY OF INVENTION

Technical Problem

A wireless power supply device may be installed outdoors. Outdoors, there are many factors that cause noise, such as dust and dirt, in a technique based on image processing. Therefore, there has been a demand for a technique that can reliably detect positional misalignment of a coil regardless of a state of an environment in which a wireless power supply device is installed.

The present disclosure describes a misalignment detection device and a coil device that are not easily affected by surroundings.

Solution to Problem

One aspect of the present disclosure is a misalignment detection device configured to detect misalignment of a second coil with respect to a first coil including a conductive wire wound around a coil axis. The misalignment detection device includes: a first induction heating unit and a second induction heating unit which receive lines of magnetic force generated by the first coil and are juxtaposed line-symmetrically with a second axis, which intersects the coil axis and a first axis intersecting the coil axis, being a line of symmetry; a first temperature measurement unit which is disposed adjacent to the first induction heating unit and outputs a first temperature; a second temperature measurement unit which is disposed adjacent to the second induction heating unit and outputs a second temperature; and a processing unit which detects misalignment of the second coil with respect to the first coil along the first axis on the basis of an evaluation value evaluating a difference between the first temperature and the second temperature.

Effects of Invention

According to the misalignment detection device and the coil device according to the present disclosure, it is possible to perform positional misalignment detection that is not easily affected by surroundings.

DESCRIPTION OF EMBODIMENTS

Hereinafter, a misalignment detection device and a coil device of the present disclosure will be described with reference to the drawings. Also, in the description of the drawings, the same elements will be denoted by the same reference numerals, and repeated descriptions thereof will be omitted.

One aspect of the present disclosure is a misalignment detection device configured to detect misalignment of a second coil with respect to a first coil including a conductive wire wound around a coil axis. The misalignment detection device includes: a first induction heating unit and a second induction heating unit which receive lines of magnetic force generated by the first coil and are juxtaposed line-symmetrically with a second axis, which intersects the coil axis and a first axis intersecting the coil axis, being a line of symmetry; a first temperature measurement unit which is disposed adjacent to the first induction heating unit and outputs a first temperature; a second temperature measurement unit which is disposed adjacent to the second induction heating unit and outputs a second temperature; and a processing unit which detects misalignment of the second coil with respect to the first coil along the first axis on the basis of an evaluation value evaluating a difference between the first temperature and the second temperature.

This device has the first induction heating unit and the second induction heating unit which are disposed line-symmetrically. These induction heating units generate heat when they receive the lines of magnetic force generated by the first coil. Further, the lines of magnetic force generated by the first coil correspond to a position of the second coil with respect to the first coil. That is, heating values of the first induction heating unit and the second induction heating unit depend on the lines of magnetic force provided to the respective induction heating units. As a result, temperatures corresponding to the heat generated by the respective induction heating units are acquired by the respective temperature measurement units. The acquired temperatures are provided to the processing unit. The processing unit can obtain the misalignment of the second coil with respect to the first coil on the basis of the evaluation value for evaluating the difference between the first temperature and the second temperature provided by the respective temperature measurement units. The first temperature is governed by the number of lines of magnetic force passing through the first induction heating unit, and the second temperature is governed by the number of lines of magnetic force passing through the second induction heating unit. That is, the first temperature and the second temperature are not easily affected by an environment in which the first coil and the second coil are disposed. Therefore, since the misalignment detection device is not affected by a state of an environment in which it is disposed, it is possible to perform positional misalignment detection that is not easily affected by surroundings.

In one aspect, the first induction heating unit and the second induction heating unit may be coils. According to this configuration, induction heating in accordance with the lines of magnetic force can be appropriately generated.

In one aspect, the evaluation value may be a difference obtained by subtracting one of the first temperature and the second temperature from the other. According to this evaluation value, the difference between the first temperature and the second temperature can be easily evaluated.

In one aspect, the evaluation value may be a ratio of one of the first temperature and the second temperature to the other. With this evaluation value, the difference between the first temperature and the second temperature can be evaluated and the misalignment can be detected.

The misalignment detection device according to one aspect may further include a third induction heating unit and a fourth induction heating unit which receive the lines of magnetic force generated by the first coil and are juxtaposed line-symmetrically with the first axis being the line of symmetry, a third temperature measurement unit which is disposed adjacent to the third induction heating unit and obtains a third temperature, and a fourth temperature measurement unit which is disposed adjacent to the fourth induction heating unit and obtains a fourth temperature. The processing unit may detect the misalignment of the second coil with respect to the first coil along the second axis on the basis of an evaluation value evaluating a difference between the third temperature and the fourth temperature. According to this configuration, the misalignment of the second coil with respect to the first coil along misalignment detection axes intersecting each other can be detected.

Another aspect of the present disclosure is a coil device configured to perform transmission and reception of electric power to and from a counterpart coil. The coil device includes: a coil including a conductive wire wound around a coil axis; a first induction heating unit and a second induction heating unit which receive lines of magnetic force generated by the coil and are juxtaposed line-symmetrically with a second axis, which intersects the coil axis and a first axis intersecting the coil axis, being a line of symmetry; a first temperature measurement unit which is disposed adjacent to the first induction heating unit and outputs a first temperature; a second temperature measurement unit which is disposed adjacent to the second induction heating unit and outputs a second temperature; and a processing unit which detects misalignment of the counterpart coil with respect to the coil along the first axis on the basis of an evaluation value evaluating a difference between the first temperature and the second temperature.

In this coil device, heating values generated in the first induction heating unit and the second induction heating unit vary depending on a form of the lines of magnetic force in accordance with a positional relationship between the coil and the counterpart coil. Temperatures caused by the heating values are acquired by a first temperature acquisition unit and a second temperature acquisition unit. As a result, the misalignment of the counterpart coil with respect to the coil can be detected on the basis of the difference between the first temperature and the second temperature provided by the respective temperature acquisition units. The first temperature is governed by the number of lines of magnetic force passing through the first induction heating unit, and the second temperature is governed by the number of lines of magnetic force passing through the second induction heating unit. That is, the first temperature and the second temperature are not easily affected by an environment in which the first coil and the second coil are disposed. Therefore, since the coil device is not affected by a state of an environment in which it is disposed, it is possible to perform positional misalignment detection that is not easily affected by surroundings.

The coil device according to another aspect may further include a housing which accommodates the coil. According to this configuration, the coil can be protected.

In another aspect, the housing may further accommodate the first induction heating unit, the second induction heating unit, the first temperature measurement unit, and the second temperature measurement unit. According to this configuration, the first induction heating unit, the second induction heating unit, the first temperature measurement unit, and the second temperature measurement unit can be protected.

Figure 1:
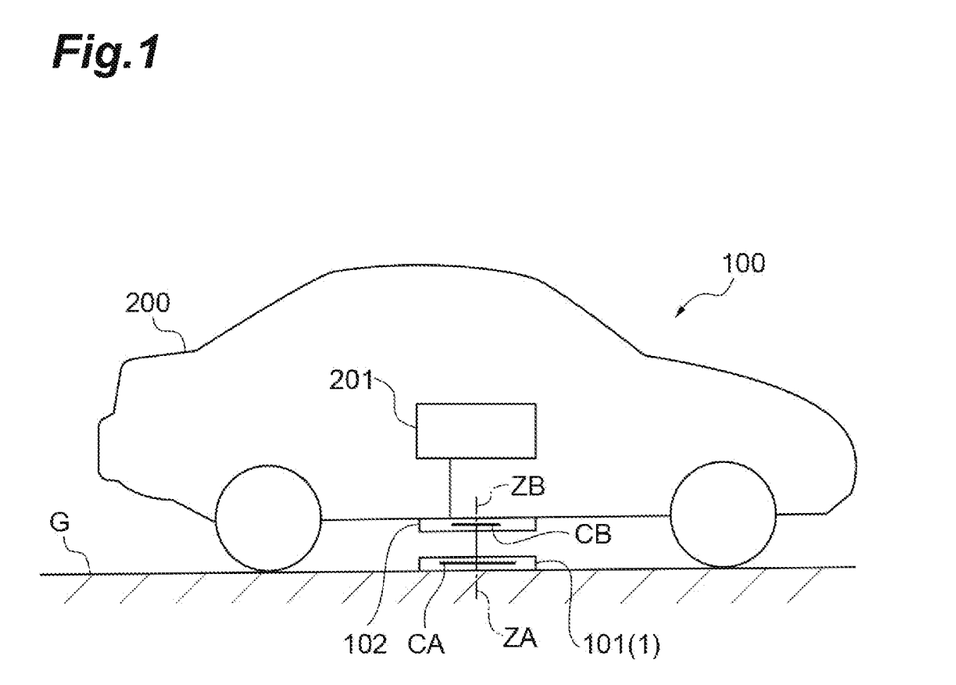
FIG. 1 is a diagram explaining a wireless power supply system using a coil device.

As shown in FIG. 1, a coil device 1 is used, for example, for a power transmitting device 101 or a power receiving device 102 in a wireless power supply system 100. The wireless power supply system 100 charges a battery 201 mounted in a vehicle 200 such as an electric vehicle or a hybrid vehicle. The coil device 1 may be used for both the power receiving device 102 and the power transmitting device 101.

When the coil device 1 is used for the power transmitting device 101, the coil device 1 serving as the power transmitting device 101 is fixed to, for example, a road surface G An external electric power source is connected to the coil device 1 via a power transmitting circuit, a rectifying circuit, and the like. On the other hand, when the coil device 1 is used for the power receiving device 102, the coil device 1 serving as the power receiving device 102 is fixed to, for example, a chassis of the vehicle 200. The battery 201 is connected to the power receiving device 102 via a power receiving circuit, a charging circuit, and the like.

The power transmitting device 101 and the power receiving device 102 face each other in a vertical direction. A power transmitting coil CA and a power receiving coil CB inside them are electromagnetically coupled to form an electromagnetic coupling circuit. As a result, wireless power supply is performed from the power transmitting coil CA of the power transmitting device 101 to the power receiving coil CB of the power receiving device 102. In other words, the power receiving device 102 receives electric power from the power transmitting device 101 in a non-contact manner. The electromagnetic coupling circuit may be a circuit that supplies electric power using an "electromagnetic induction" or may be a circuit that supplies electric power using a "magnetic resonance."

Hereinafter, the coil device 1 will be described in more detail by exemplifying an aspect in which the coil device 1 is used as the power transmitting device 101.

Figure 2:
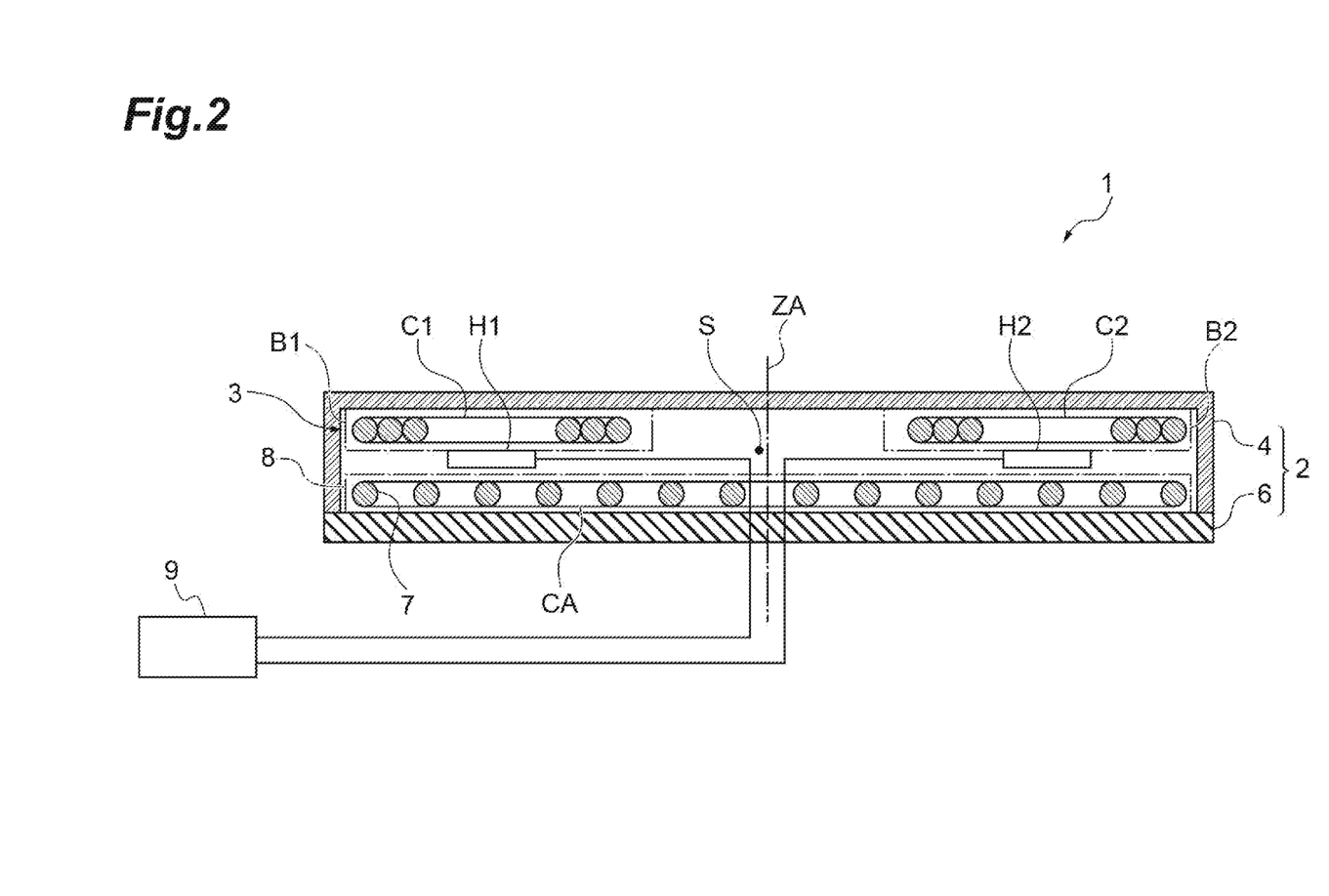
FIG. 2 is a cross-sectional view showing a configuration of the coil device.

A shape of the coil device 1 is, for example, flat. As shown in FIG. 2, the coil device 1 includes a housing 2, the power transmitting coil CA (a first coil), and a misalignment detection device 3.

The housing 2 accommodates at least the power transmitting coil CA. The housing 2 includes a cover 4 and a base 6. At least the power transmitting coil CA is disposed in an accommodation space S surrounded by the cover 4 and the base 6.

The cover 4 is a box body disposed on a front surface side of the power transmitting coil CA. The cover 4 is an exterior member. The cover 4 protects interior parts including the power transmitting coil CA. The cover 4 is made of, for example, a non-magnetic and non-conductive material. For the material of the cover 4, for example, glass fiber reinforced plastic (GFRP) may be used.

The base 6 is a plate-shaped member disposed on a back surface side of the power transmitting coil CA. The base 6 secures rigidity of the entire coil device 1. A material of the base 6 is, for example, non-magnetic and conductive. A material having a relatively high rigidity is used for the material of the base 6.

For the material of the base 6, for example, aluminum, which is a metal material having a low magnetic permeability, may be used. According to the selection of the material of the base 6, the base 6 can shield leaking magnetic flux from flowing to the outside. In other words, the base 6 has a magnetic shielding property.

The cover 4 and the base 6 form the accommodation space S that accommodates the power transmitting coil CA and the like. When the coil device 1 is applied to the power transmitting device 101, the cover 4 faces the power receiving device 102. Further, the base 6 is disposed on a side fixed to the road surface G In each flat portion of the coil device 1, a surface close to and facing the other coil device is referred to as a "front surface." A surface away from other coil device, that is, a surface opposite to the front surface, is referred to as a "back surface."

The power transmitting coil CA transmits and receives electric power to and from the power receiving coil CB (a counterpart coil or a second coil; see FIG. 1) included in the power receiving device 102. The power transmitting coil CA generates magnetic flux for transmission and reception of the electric power. The power transmitting coil CA is formed, for example, by a conductive wire 7 wound in a substantially rectangular spiral shape in the same plane. The power transmitting coil CA is, for example, a circular coil. In the circular coil, the conductive wire 7 is wound in a winding direction to surround a winding axis ZA (a coil axis). In this case, the winding direction is a direction extending in a spiral shape and is a direction along a plane perpendicular to the winding axis ZA. For the conductive wire 7, for example, a litz wire in which a plurality of conductor strands insulated from each other are twisted is used. For the conductive wire 7, a litz wire having inhibited high frequency resistance due to the skin effect may be used. For the conductive wire 7, a single wire made of copper or aluminum may be used.

The power transmitting coil CA is fitted, for example, in a groove of a bobbin 8 which is a flat plate-shaped member. The bobbin 8 is made of a non-magnetic and non-conductive material. Examples of the non-magnetic and non-conductive material include silicone and a polyphenylene sulfide resin. By fixing the bobbin 8 to the base 6, a position of the power transmitting coil CA in the accommodation space S is determined. If necessary, a ferrite plate may be provided between the bobbin 8 and the base 6. In other words, the ferrite plate may be disposed between the power transmitting coil CA and the base 6. The ferrite plate may be substantially equal in size to the bobbin 8. Further, the ferrite plate may be larger than the bobbin 8. The bobbin 8 is interposed between the ferrite plate and the power transmitting coil CA. Therefore, the power transmitting coil CA does not abut the ferrite plate. The power transmitting coil CA may abut the ferrite plate.

Figure 3:
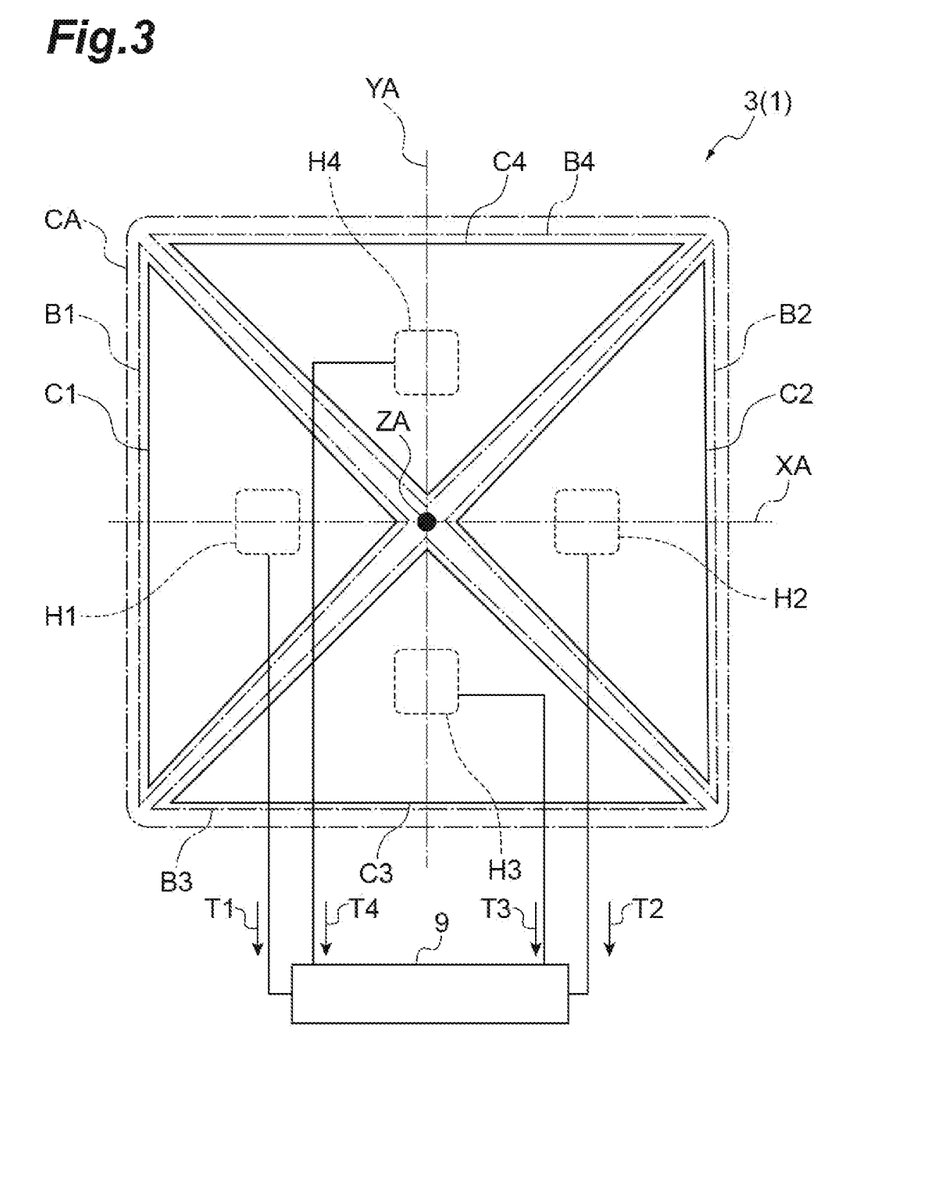
FIG. 3 is a plan view showing a main coil included in the coil device.

As shown in FIGS. 2 and 3, the misalignment detection device 3 includes coils C1, C2, C3, and C4, temperature sensors H1, H2, H3, and H4, and a processing device 9 (a processing unit). The coil C1 is a first induction heating unit. The coil C2 is a second induction heating unit. The coil C3 is a third induction heating unit. The coil C4 is a fourth induction heating unit. The temperature sensor H1 is a first temperature measurement unit. The temperature sensor H2 is a second temperature measurement unit. The temperature sensor H3 is a third temperature measurement unit. The temperature sensor H4 is a fourth temperature measurement unit. The coils C1, C2, C3, and C4 and the temperature sensors H1, H2, H3, and H4 are accommodated inside the housing 2. Also, the processing device 9 may not be accommodated in the housing 2. The processing device 9 may be accommodated in the housing 2.

The misalignment detection device 3 has the winding axis ZA, an axis line XA (a first axis), and an axis line YA (a second axis). The axis lines XA and YA are misalignment detection axes in the misalignment detection device 3. Further, the axis lines XA and YA are also a line of symmetry. The axis line XA is orthogonal to (intersects) the axis line YA and the winding axis ZA. The axis line YA is orthogonal to (intersects) the axis line XA and the winding axis ZA. The winding axis ZA and the axis lines XA and YA form a three-axis orthogonal coordinate system.

The misalignment detection device 3 detects misalignment of the power receiving coil CB of the power receiving device 102 with respect to the power transmitting coil CA of the power transmitting device 101. The "misalignment" referred to here may be defined as, for example, a relative position of a winding axis ZB of the power receiving coil CB with respect to the winding axis ZA of the power transmitting coil CA. That is, when the winding axis ZA of the power transmitting coil CA is on the same straight line as the winding axis ZB of the power receiving coil CB (see FIG. 4), there may be no "misalignment." On the other hand, when the winding axis ZA of the power transmitting coil CA is not on the same straight line as the winding axis ZB of the power receiving coil CB (see FIG. 6), there may be "misalignment." In other words, when the power transmitting coil CA and the power receiving coil CB are viewed in a plan view and the winding axis ZA of the power transmitting coil CA and the winding axis ZB of the power receiving coil CB are located at different positions, it may be determined that there is "misalignment." Also, the definition of "misalignment" may be based on configurations different from those of the winding axes ZA and ZB. For example, a positional relationship between the power transmitting coil CA and the power receiving coil CB, at which a desired transmission efficiency is achieved, may not be "misalignment." For example, for a positional relationship that maximizes the transmission efficiency, it may be determined that there is no "misalignment." Further, for a positional relationship that does not achieve the desired transmission efficiency, it may be determined that there is "misalignment."

The misalignment of the power receiving coil CB with respect to the power transmitting coil CA is indicated by misalignment along the axis line XA and misalignment along the axis line YA. Therefore, the misalignment detection axis is defined as a reference for indicating this misalignment.

The misalignment detection device 3 detects the misalignment in a direction of the axis line XA using the coils C1 and C2 and the temperature sensors H1 and H2. The coils C1 and C2 are juxtaposed along the axis line XA with the axis line XA set as the misalignment detection axis. The coils C1 and C2 are disposed line-symmetrically with the axis line YA set as the axis of symmetry when viewed in a plan view in a direction of the winding axis ZA. The coils C1 and C2 are disposed on both sides of the winding axis ZA with the winding axis ZA interposed therebetween. Line symmetry includes symmetry between positions at which the coils C1 and C2 are disposed. Further, line symmetry also includes symmetry between planar shapes of the coils C1 and C2.

The misalignment detection device 3 detects the misalignment in a direction of the axis line YA using the coils C3 and C4 and the temperature sensors H3 and H4. The coils C3 and C4 are juxtaposed along the axis line YA with the axis line YA set as the misalignment detection axis. The coils C3 and C4 are disposed line-symmetrically with the axis XA set as the axis of symmetry when viewed in a plan view in the direction of the winding axis ZA. The coils C3 and C4 are disposed on both sides of the winding axis ZA with the winding axis ZA interposed therebetween.

The coils C1, C2, C3, and C4 are configured of wound conductive wires like the power transmitting coil CA and the power receiving coil CB. In FIG. 3, outer shapes of the coils C1, C2, C3, and C4 are shown as triangles with solid lines. That is, the coils C1, C2, C3, and C4 in FIG. 3 are not shown with the wound conductive wires. According to the illustration of FIG. 3, the coils C1, C2, C3, and C4 have isosceles triangle shapes when viewed in a plan view. As described above, the arrangement of the coils C1, C2, C3 and C4 is line symmetric. Therefore, the planar shapes of the coils C1, C2, C3, and C4 are congruent with each other.

The coils C1, C2, C3 and C4 are held by bobbins B1, B2, B3 and B4. The bobbins B1, B2, B3, and B4 are separate from each other. In addition, the bobbins B1, B2, B3, and B4 may be disposed with gaps provided therebetween. According to this arrangement, the coils C1, C2, C3, and C4 and the bobbins B1, B2, B3, and B4 can be formed to be thermally independent from each other. Therefore, differences in temperature between the coils C1, C2, C3 and C4 and between the bobbins B1, B2, B3 and B4 can be appropriately generated.

The bobbins B1, B2, B3, and B4 that hold the coils C1, C2, C3, and C4 are attached to a back surface of the cover 4 (see FIG. 2). The coils C1, C2, C3, and C4 are disposed above the power transmitting coil CA. In other words, the coils C1, C2, C3, and C4 are disposed to be separated from the power transmitting coil CA in the direction of the winding axis ZA of the power transmitting coil CA. According to this arrangement, the coils C1, C2, C3 and C4 face the power transmitting coil CA.

The temperature sensors H1, H2, H3, and H4 output data related to temperatures to the processing device 9. The temperature sensors H1, H2, H3, and H4 are disposed adjacent to the coils C1, C2, C3, and C4, respectively. Specifically, the temperature sensors H1, H2, H3, and H4 are attached to back surfaces of the bobbins B1, B2, B3, and B4. Also, the temperature sensors H1, H2, H3, and H4 may be embedded in the bobbins B1, B2, B3, and B4.

Positions at which the temperature sensors H1, H2, H3, and H4 are provided are positions at which temperatures of the coils C1, C2, C3, and C4 can be acquired. The fact that each temperature can be acquired means that, for example, the temperature sensor H1 acquires a temperature at which heat generated by the coil C1 is dominant. In other words, the temperature at the position at which the temperature sensor H1 is provided is a temperature when influence of the heat generated by the coil C1 is dominant and influence of the heat generated by the coils C2, C3, and C4 is in a negligible range as compared with that of the heat generated by the coil C1. For example, providing the temperature sensor H1 adjacent to the coil C1 may mean disposing the temperature sensor H1 at a position at which the heat generated by the coil C1 is dominant. Therefore, the temperature sensors H1, H2, H3, and H4 may not be disposed close to each other, but may be disposed to be largely separated from each other.

The processing device 9 detects presence or absence of the misalignment using the temperature T1 (a first temperature), the temperature T2 (a second temperature), the temperature T3 (a third temperature), and the temperature T4 (a fourth temperature) which are provided by the temperature sensors H1, H2, H3, and H4. The processing device 9 is, for example, an arbitrary suitable processor such as a central processing unit (CPU) or a dedicated processor specialized for each type of processing (for example, a digital signal processor (DSP)). The processing device 9 can appropriately include a read only memory (ROM) and a random access memory (RAM) for executing the processing.

Figure 4:
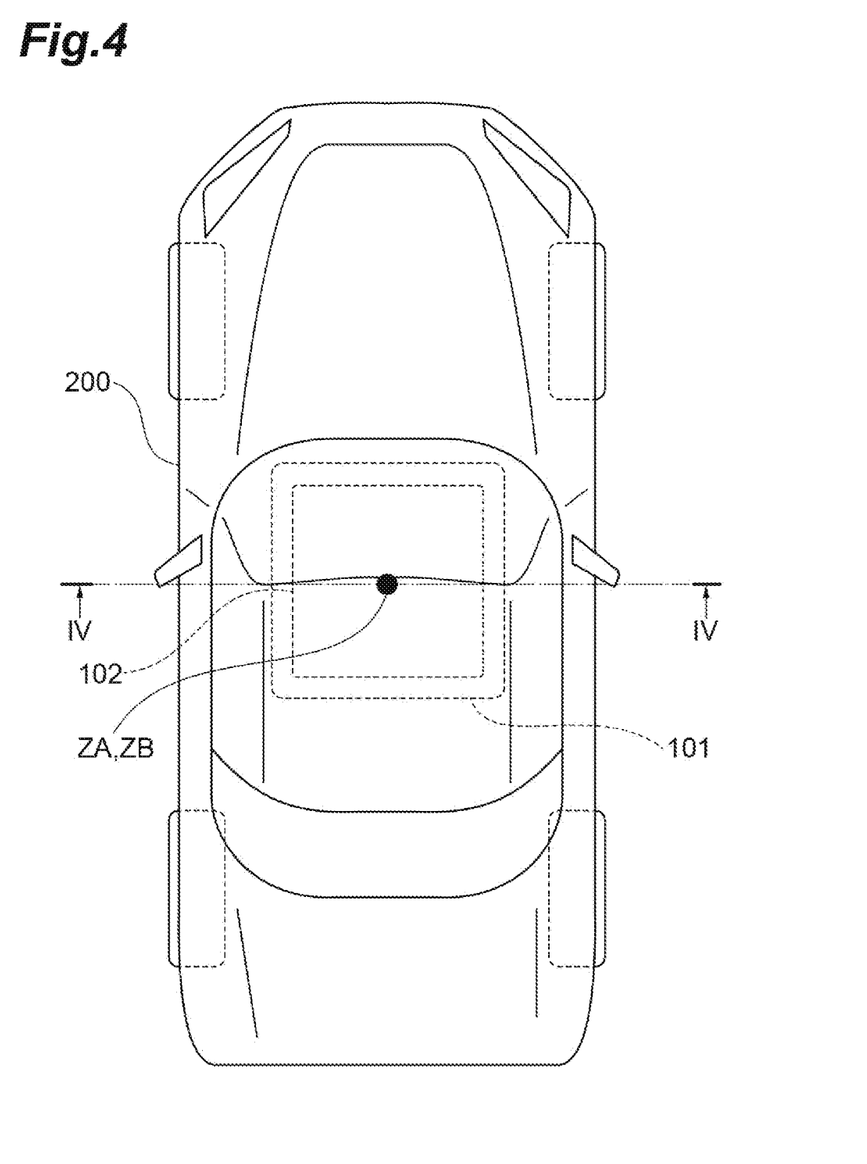
FIG. 4 is a diagram illustrating a case in which coils do not deviate from each other in the wireless power supply system.
Figure 5:
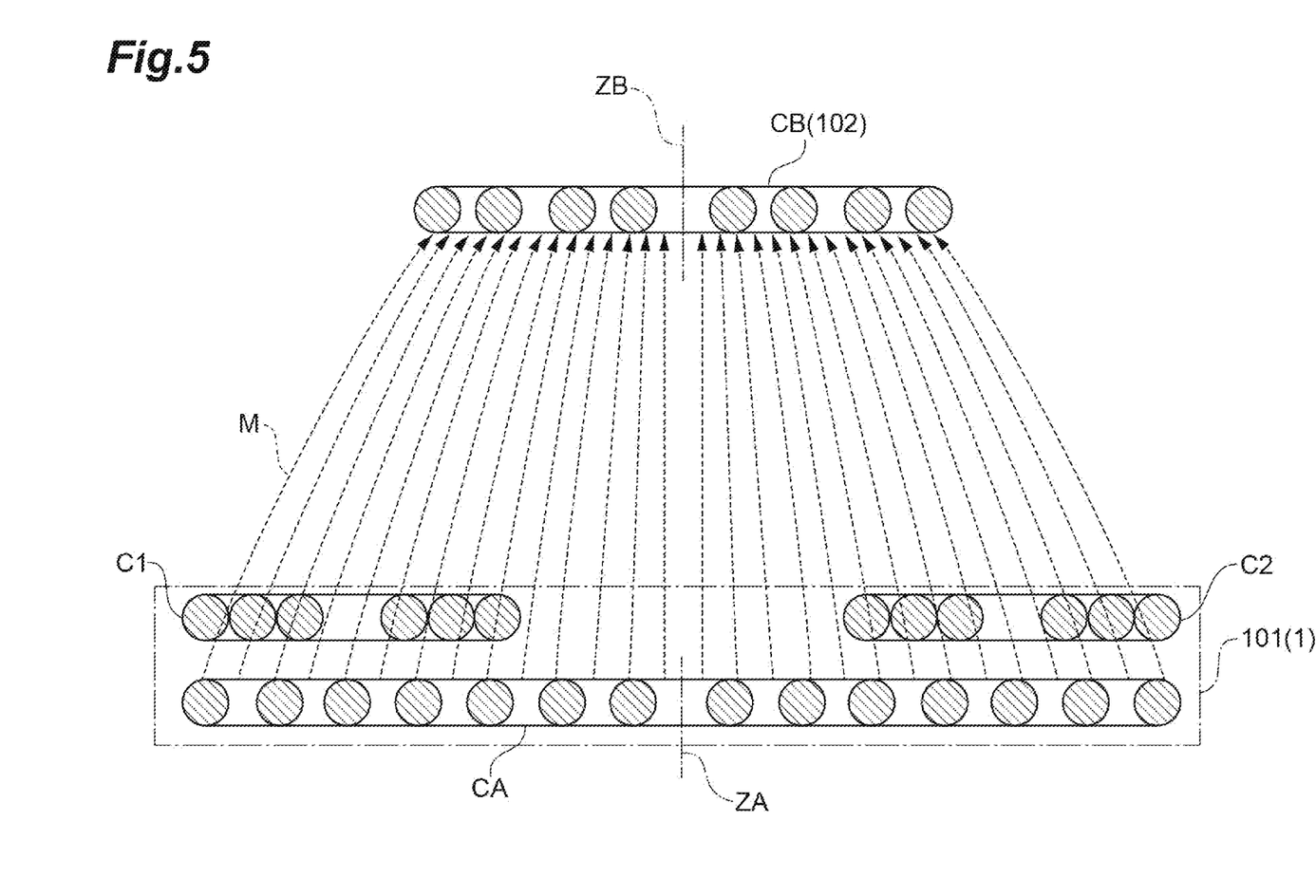
FIG. 5 is a conceptual diagram showing lines of magnetic force between a coil of a power transmitting device and a coil of a power receiving device in FIG. 4.

A case in which there is no misalignment will be illustrated. As shown in FIG. 4, the winding axis ZB of the power receiving device 102 mounted in the vehicle 200 coincides with the winding axis ZA of the power transmitting device 101 embedded in the road surface G FIG. 5 shows cross-sections of the power receiving device 102 and the power transmitting device 101 along line IV-IV. In FIG. 5, only the power receiving coil CB of the power receiving device 102, the power transmitting coil CA of the power transmitting device 101, and the coils C1 and C2 are shown.

FIG. 5 shows lines of magnetic force M generated between the power transmitting coil CA and the power receiving coil CB. The coils C1 and C2 are present between the power transmitting coil CA and the power receiving coil CB. Therefore, the lines of magnetic force M pass through the coils C1 and C2. Here, when the power receiving coil CB is not misaligned with the power transmitting coil CA, the lines of magnetic force M are symmetrical with respect to the winding axes ZA and ZB. In other words, the number of the lines of magnetic force M passing through the coil C1 is the same as the number of the lines of magnetic force M passing through the coil C2. For example, in the example shown in FIG. 5, nine lines of magnetic force M pass through each of the coils C1 and C2.

When the lines of magnetic force M pass through the coils C1 and C2, induced currents are generated in the coils C1 and C2. Magnitudes of the induced currents depend on the number of the lines of magnetic force M passing through the coils C1 and C2. In the example shown in FIG. 5, nine lines of magnetic force M pass through each of the coils C1 and C2. Therefore, the magnitude of the induced current generated in the coil C1 is the same as the magnitude of the induced current generated in the coil C2. When the induced currents are generated in the coils C1 and C2, the coils C1 and C2 generate heat. These heating values depend on the magnitudes of the induced currents. As described above, since the magnitudes of the induced currents generated in the coils C1 and C2 are the same, the heating values of the coils C1 and C2 are also the same. As a result, the temperature of the coil C1 is the same as the temperature of the coil C2.

In the present disclosure, the coils C1 and C2 have been shown as examples of the induction heating units. The misalignment detection device 3 utilizes the heat generated in accordance with the lines of magnetic force M passing therethrough. Therefore, the induction heating units are not limited to the coils as long as heat generation corresponding to the lines of magnetic force M can be obtained. For example, the induction heating units may be metal ring-shaped members.

Figure 6:
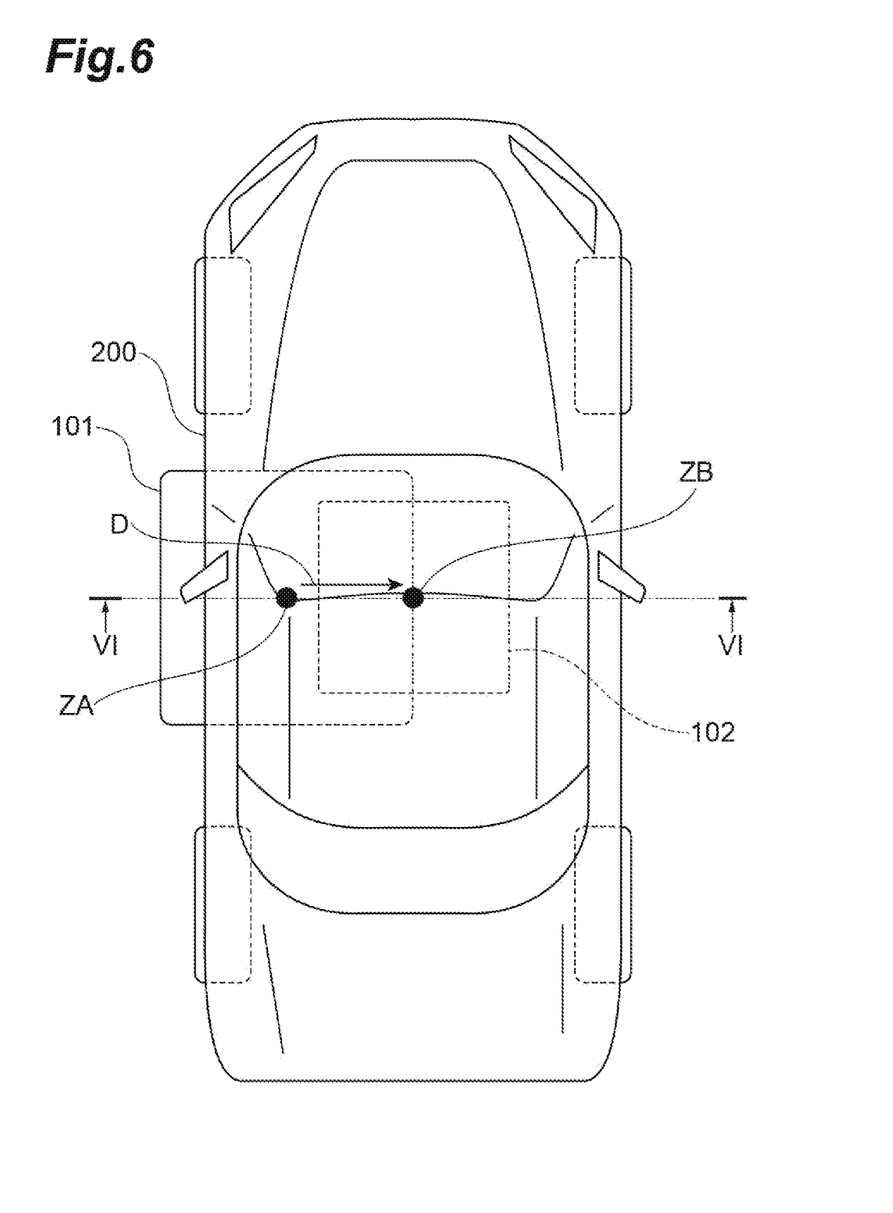
FIG. 6 is a diagram illustrating a case in which the coils deviate from each other in the wireless power supply system s.
Figure 7:
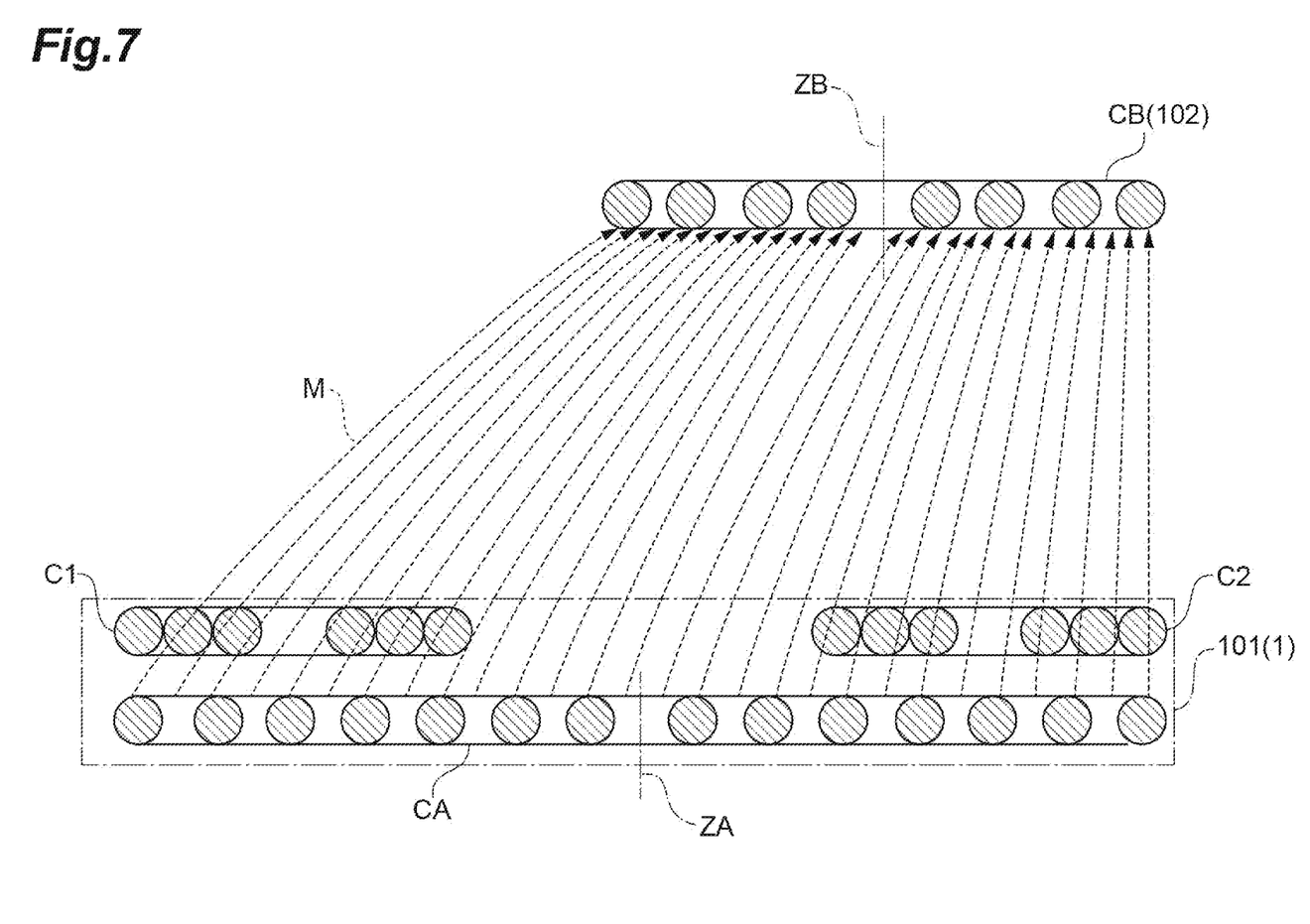
FIG. 7 is a conceptual diagram showing lines of magnetic force between a coil of a power transmitting device and a coil of a power receiving device in FIG. 6.

Next, a case in which there is misalignment will be illustrated. As shown in FIG. 6, the winding axis ZB of the power receiving device 102 mounted in the vehicle 200 is misaligned with the winding axis ZA of the power transmitting device 101 embedded in the road surface G (see misalignment D). FIG. 7 shows a cross-section of the power receiving device 102 and the power transmitting device 101 along line VI-VI.

As shown in FIG. 7, when the power receiving coil CB is misaligned with the power transmitting coil CA, the lines of magnetic force M are not symmetrical with respect to the winding axes ZA and ZB. The lines of magnetic force M are emitted from the power transmitting coil CA and directed to the power receiving coil CB. However, since the power receiving coil CB is misaligned with the power transmitting coil CA, a distribution of the lines of magnetic force M is not symmetrical. As a result, there is a difference between the number of the lines of magnetic force M passing through the coil C1 and the number of the lines of magnetic force M passing through the coil C2. In the example of FIG. 7, the number of the lines of magnetic force M passing through the coil C1 is eight. On the other hand, the number of the lines of magnetic force M passing through the coil C2 is ten.

When the numbers of the lines of magnetic force M passing through the coils C1 and C2 are different from each other, the magnitudes of the induced currents generated in the coils C1 and C2 are also different from each other. As a result, the heating values of the coils C1 and C2 due to the induced currents are also different from each other. Therefore, as a result, the temperature T1 related to the coil C1 is different from the temperature T2 related to the coil C2 (T1<T2). In other words, the temperature of the bobbin B1 is different from the temperature of the bobbin B2.

That is, by evaluating the difference in temperature between the coils C1 and C2, it is possible to detect presence or absence of the misalignment of the power receiving coil CB with respect to the power transmitting coil CA. In other words, by evaluating the difference in temperature between the bobbins B1 and B2, it is possible to detect presence or absence of the misalignment of the power receiving coil CB with respect to the power transmitting coil CA. The processing device 9 detects presence or absence of the misalignment by using an evaluation value for evaluating the difference between the temperature T1 of the coil C1 and the temperature T2 of the coil C2.

The processing device 9 uses the difference between the temperature T1 of the coil C1 and the temperature T2 of the coil C2 as the evaluation value. In other words, the process-ing device 9 uses the difference between the temperature T1 of the bobbin B1 and the temperature T2 of the bobbin B2 as the evaluation value. For example, the temperature T2 of the coil C2 is subtracted from the temperature T1 of the coil C1. In other words, the temperature T2 of the bobbin B2 is subtracted from the temperature T1 of the bobbin B1. As a result, a difference $\Delta T$ (T1−T2) is obtained. When an absolute value $|\Delta T|$ of the difference $\Delta T$ is included in a preset range ($0 \leq |\Delta T| \leq T_{th}$), the processing device 9 may determine that there is no misalignment. On the other hand, when the difference $\Delta T$ is not included in the preset range ($T_{th} < |\Delta T|$), the processing device 9 may determine that there is misalignment. Further, the processing device 9 may specify a direction of the misalignment on the basis of a sign (positive or negative) of the difference $\Delta T$.

In short, the coil device 1 and the misalignment detection device 3 have the coils C1 and C2 and the coils C3 and C4 which are disposed line-symmetrically. When these coils C1, C2, C3, and C4 receive the lines of magnetic force M generated by the power transmitting coil CA, induced currents are generated, and the induced currents generate heat. In addition, the lines of magnetic force M generated by the power transmitting coil CA correspond to a position of the power receiving coil CB with respect to the power transmitting coil CA. That is, the heating values of the coils C1, C2, C3, and C4 depend on the number of the lines of magnetic force M provided to the respective coils C1, C2, C3, and C4. As a result, the temperatures corresponding to the heat generated by the respective coils C1, C2, C3, and C4 are acquired by the respective temperature sensors H1, H2, H3, and H4. The acquired temperatures T1, T2, T3, and T4 are provided to the processing device 9. Then, the processing device 9 can obtain the misalignment of the power receiving coil CB with respect to the power transmitting coil CA on the basis of the temperatures T1, T2, T3, and T4 provided by the respective temperature sensors H1, H2, H3, and H4 and the difference $\Delta T$ to be evaluated. The temperatures T1, T2, T3, and T4 are governed by the number of the lines of magnetic force M passing through the coils C1, C2, C3, and C4, respectively. Therefore, the temperatures T1, T2, T3, and T4 are not easily affected by an environment in which the power transmitting coil CA and the power receiving coil CB are disposed. Accordingly, since the coil device 1 and the misalignment detection device 3 are not affected by the state of an environment in which they are installed, it is possible to perform positional misalignment detection that is not easily affected by surroundings.

The misalignment detection device 3 detects the misalignment of the power transmitting coil CA and the power receiving coil CB in accordance with the heat generated by the coils C1, C2, C3, and C4. Therefore, the misalignment detection device 3 does not need to use image processing using a camera. As a result, it is relatively simple to perform configuring and processing of the misalignment detection device 3 as compared with a configuration using a camera. As a result, the misalignment detection device 3 can reduce costs. Further, the misalignment detection device 3 is not easily affected by dust and dirt. As a result, the misalignment detection device 3 can perform positional misalignment detection that is not easily affected by surroundings.

The first induction heating unit and the second induction heating unit are the coils C1 and C2. According to this configuration, induction heating in accordance with the lines of magnetic force M can be appropriately generated.

The evaluation value is the difference $\Delta T$ obtained by subtracting one of the temperatures T1 and T2 from the other. According to this evaluation value, the difference between the temperatures T1 and T2 can be easily evaluated.

The coil device 1 includes the housing 2 that accommodates the power transmitting coil CA. According to this configuration, the power transmitting coil CA can be protected.

The housing 2 accommodates the coils C1, C2, C3, and C4 and the temperature sensors H1, H2, H3, and H4. According to this configuration, the coils C1, C2, C3, and C4 and the temperature sensors H1, H2, H3, and H4 can be protected.

Although the coil device 1 and the misalignment detection device 3 of the present disclosure have been described, the coil device 1 and the misalignment detection device 3 of the present disclosure are not limited to the above aspects.

For example, as a value for evaluating the difference in temperature, a ratio between the temperatures T1 and T2 (T2/T1) may be used instead of the difference ΔT in temperature. Presence or absence of the misalignment can be appropriately detected also with this evaluation value. For example, a temperature generated in a case in which the maximum allowable misalignment occurs is calculated in advance through actual measurement or analysis. Then, a threshold ratio is obtained from the obtained temperature. Here, provided that temperatures T1R and T2R are obtained when the maximum misalignment occurs in one direction (for example, a rightward direction of the paper surface in FIG. 7), the threshold ratio in one direction is (TSR=T2R/T1R). On the other hand, provided that temperatures T1L and T2L are obtained when the maximum misalignment occurs in the other direction (for example, a leftward direction of the paper surface in FIG. 7), the threshold ratio in the other direction is (TSL=T2L/T1L). Then, the processing device 9 compares the ratio (T2/T1) obtained when the coils are operated with the threshold ratio (TSR and TSL). Specifically, the processing device 9 may determine that there is no misalignment when the ratio (T2/T1) is included in a range indicated by the threshold ratio (TSL≤(T2/T1)≤TSR). On the other hand, when the ratio (T2/T1) is not included in the range indicated by the threshold ratio ((T2/T1)<TSL or TSR<(T2/T1)), the processing device 9 may determine that there is misalignment.

Figure 8A:
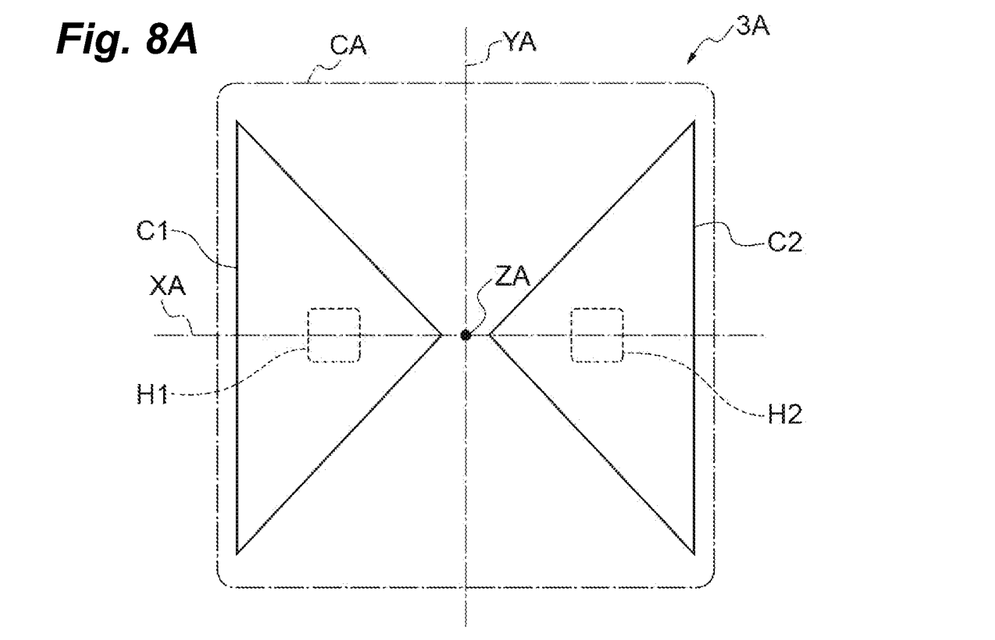
FIGS. 8A and 8B are a plan view showing an arrangement of coils of a misalignment detection device according to a modified example.
Figure 8B:
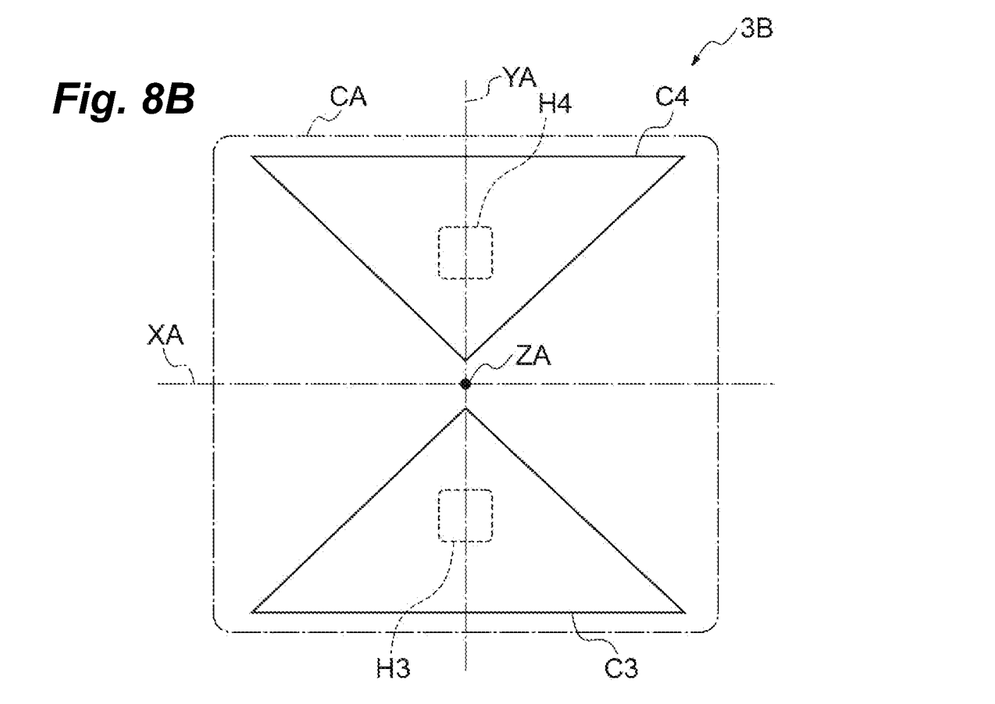

As shown in FIG. 8A and FIG. 8B, the number of the misalignment detection axes included in the misalignment detection devices 3A and 3B may be one. The misalignment detection device 3A shown in FIG. 8A uses the axis line XA as the misalignment detection axis. The misalignment detection device 3A has the axis line YA as the axis of symmetry. The misalignment detection device 3B shown in FIG. 8B uses the axis line YA as the misalignment detection axis. The misalignment detection device 3B has the axis line XA as the axis of symmetry. According to such a configuration, the configuration of the misalignment detection devices 3A and 3B can be simplified.

Figure 9A:
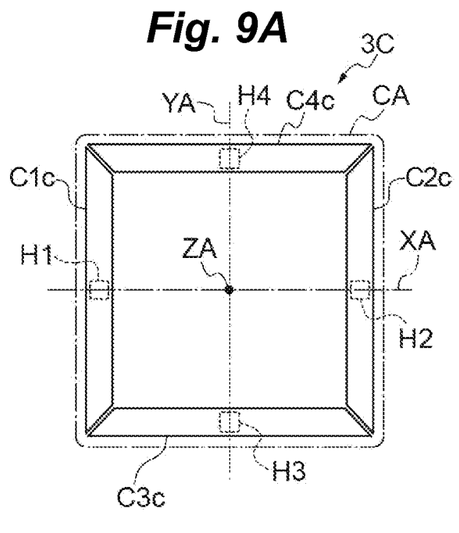
FIGS. 9A to 9D are a plan view showing planar shapes of coils of a misalignment detection device according to another modified example.
Figure 9B:
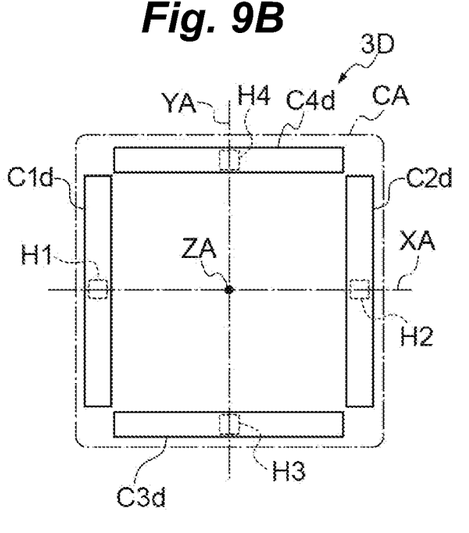
Figure 9C:
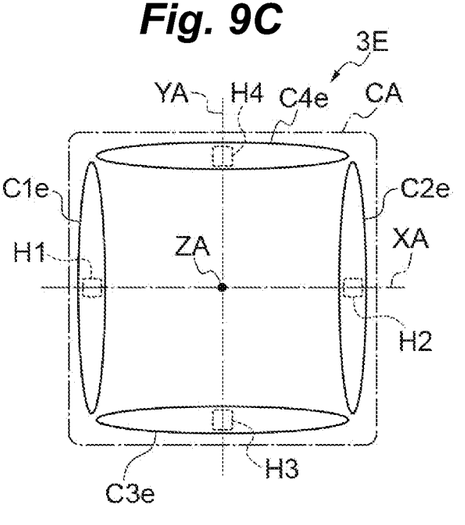
Figure 9D:
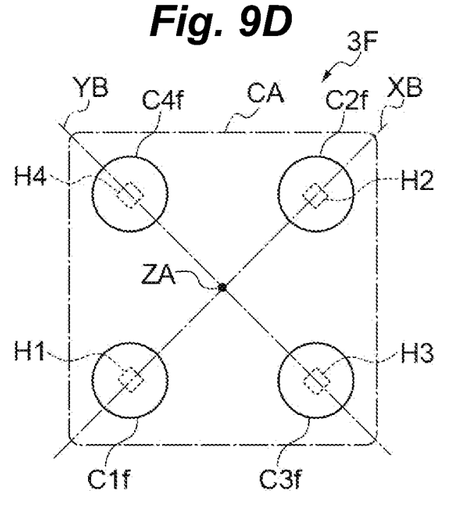

As shown in FIG. 9A, FIG. 9B, FIG. 9C, and FIG. 9D, a planar shape of each coil of misalignment detection devices 3C, 3D, 3E, and 3F may be formed into a desired shape. For example, as shown in FIG. 9A, coils C1c, C2c, C3c, and C4c of the misalignment detection device 3C may each have a trapezoidal shape. The coils C1c, C2c, C3c, and C4c may be disposed along an outer edge portion of the power transmitting coil CA. As shown in FIG. 9B, coils C1d, C2d, C3d, and C4d of the misalignment detection device 3D may have rectangular shapes. As shown in FIG. 9C, coils C1e, C2e, C3e, and C4e of the misalignment detection device 3E may have elliptical shapes. As shown in FIG. 9D, coils C1f, C2f, C3f, and C4f of the misalignment detection device 3F may have circular shapes. Axis lines XB and YB of the misalignment detection device 3F shown in FIG. 9D may be diagonal lines in a square-shaped power transmitting coil CA. According to the configuration of the axes XB and YB, the coils C1f and C2f are disposed with the axis line YB set as the axis of symmetry. In addition, the axis line XB serves as the misalignment detection axis. The coils C3f and C4f are disposed with the axis line XB set as the axis of symmetry. The axis line YB serves as the misalignment detection axis. The misalignment detection devices 3C, 3D, 3E, and 3F can appropriately detect the misalignment of the power receiving coil CB with respect to the power transmitting coil CA.

Figure 10:
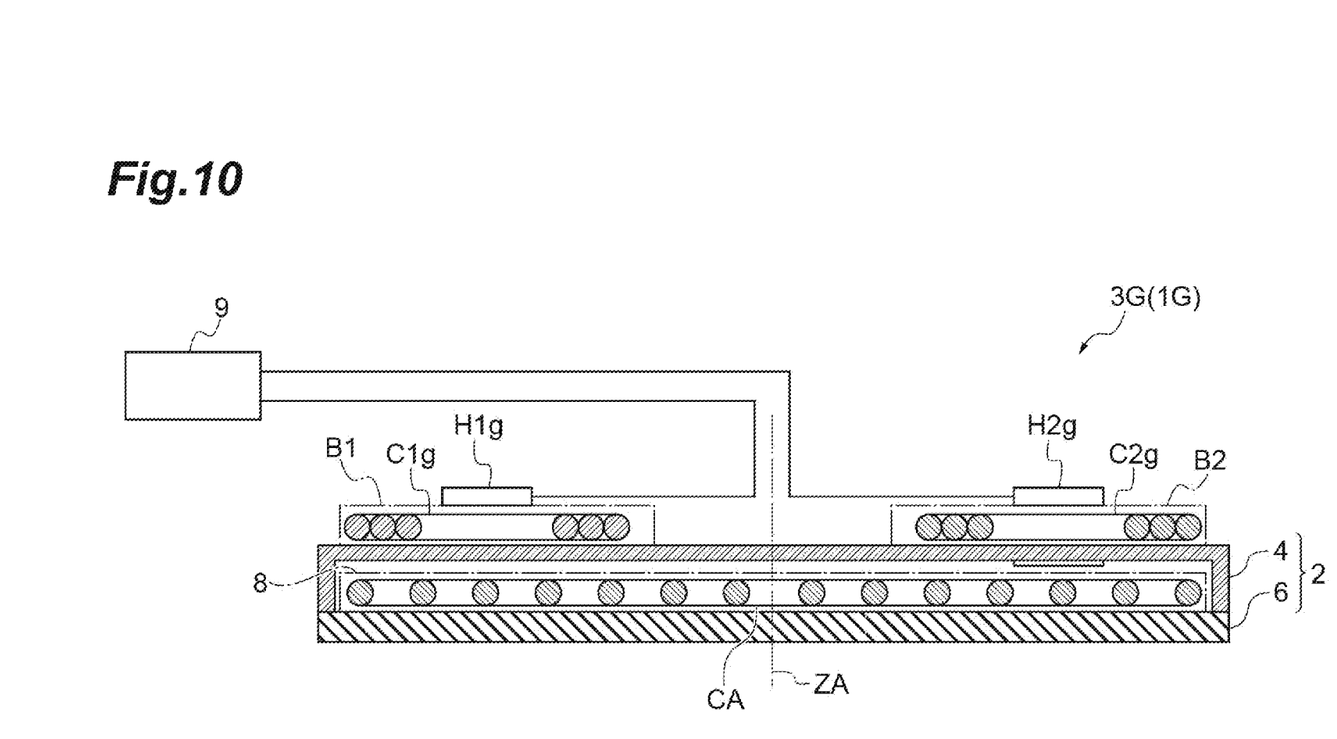
FIG. 10 is a cross-sectional view showing a configuration of a coil device according to still another modified example.

As shown in FIG. 10, coils C1g and C2g of the misalignment detection device 3G and temperature sensors H1g and H2g may be disposed outside the housing 2. According to this configuration, it is possible to obtain a coil device 1G in which a misalignment detection device 3G is retrofitted to an existing coil device.

REFERENCE SIGNS LIST

1 Coil device
2 Housing
3, 3A, 3B, 3C, 3D, 3E, 3F, 3G Misalignment detection device
4 Cover
6 Base
7 Conductive wire
8 Bobbin
9 Processing device (processing unit)
100 Wireless power supply system
101 Power transmitting device
102 Power receiving device
200 Vehicle
201 Battery
B1, B2, B4, B4 Bobbin
CA Power transmitting coil (first coil)
CB Power receiving coil (second coil or counterpart coil)
C1 Coil (first induction heating unit)
C2 Coil (second induction heating unit)
C3 Coil (third induction heating unit)
C4 Coil (fourth induction heating unit)
G Road surface
H1, H1g Temperature sensor (first temperature measurement unit)
H2, H2g Temperature sensor (second temperature measurement unit)
H3 Temperature sensor (third temperature measurement unit)
H4 Temperature sensor (fourth temperature measurement unit)
S Accommodation space
T1 Temperature (first temperature)
T2 Temperature (second temperature)
T3 Temperature (third temperature)
T4 Temperature (fourth temperature)
M Lines of magnetic force
XA, XB Axis line (first axis)
YA, YB Axis line (second axis)
ZA, ZB Winding axis (coil axis)

The invention claimed is:

1. A misalignment detection device configured to detect misalignment of a second coil with respect to a first coil including a conductive wire wound around a coil axis of the first coil, comprising:

a first induction heating unit and a second induction heating unit which receive lines of magnetic force generated by the first coil and are juxtaposed line-symmetrically with a second axis, which intersects the coil axis and a first axis intersecting the coil axis, being a line of symmetry;
a first temperature measurement unit which is disposed adjacent to the first induction heating unit and outputs a first temperature;
a second temperature measurement unit which is disposed adjacent to the second induction heating unit and outputs a second temperature; and
a processing unit which detects misalignment of the second coil with respect to the first coil along the first axis on the basis of an evaluation value evaluating a difference between the first temperature and the second temperature,
wherein the first induction heating unit and the second induction heating unit are coils.

2. The misalignment detection device according to claim 1, wherein the evaluation value is a difference obtained by subtracting one of the first temperature and the second temperature from the other.

3. The misalignment detection device according to claim 1, further comprising:
a third induction heating unit and a fourth induction heating unit which receive the lines of magnetic force generated by the first coil and are juxtaposed line-symmetrically with the first axis being the line of symmetry;
a third temperature measurement unit which is disposed adjacent to the third induction heating unit and obtains a third temperature; and
a fourth temperature measurement unit which is disposed adjacent to the fourth induction heating unit and obtains a fourth temperature,
wherein the processing unit detects the misalignment of the second coil with respect to the first coil along the second axis on the basis of an evaluation value evaluating a difference between the third temperature and the fourth temperature.

4. A misalignment detection device configured to detect misalignment of a second coil with respect to a first coil including a conductive wire wound around a coil axis, comprising:
a first induction heating unit and a second induction heating unit which receive lines of magnetic force generated by the first coil and are juxtaposed line-symmetrically with a second axis, which intersects the coil axis and a first axis intersecting the coil axis, being a line of symmetry;
a first temperature measurement unit which is disposed adjacent to the first induction heating unit and outputs a first temperature;
a second temperature measurement unit which is disposed adjacent to the second induction heating unit and outputs a second temperature; and
a processing unit which detects misalignment of the second coil with respect to the first coil along the first axis on the basis of an evaluation value evaluating a difference between the first temperature and the second temperature,
wherein the evaluation value is a ratio of one of the first temperature and the second temperature to the other.

5. The misalignment detection device according to claim 4, further comprising:
a third induction heating unit and a fourth induction heating unit which receive the lines of magnetic force generated by the first coil and are juxtaposed line-symmetrically with the first axis being the line of symmetry;
a third temperature measurement unit which is disposed adjacent to the third induction heating unit and obtains a third temperature; and
a fourth temperature measurement unit which is disposed adjacent to the fourth induction heating unit and obtains a fourth temperature,
wherein the processing unit detects the misalignment of the second coil with respect to the first coil along the second axis on the basis of an evaluation value evaluating a difference between the third temperature and the fourth temperature.

6. A coil device configured to perform transmission and reception of electric power to and from a counterpart coil, comprising:
a coil including a conductive wire wound around a coil axis;
a first induction heating unit and a second induction heating unit which receive lines of magnetic force generated by the coil and are juxtaposed line-symmetrically with a second axis, which intersects the coil axis and a first axis intersecting the coil axis, being a line of symmetry;
a first temperature measurement unit which is disposed adjacent to the first induction heating unit and outputs a first temperature;
a second temperature measurement unit which is disposed adjacent to the second induction heating unit and outputs a second temperature;
a processing unit which detects misalignment of the counterpart coil with respect to the coil along the first axis on the basis of an evaluation value evaluating a difference between the first temperature and the second temperature; and
a housing which accommodates the coil;
wherein the housing further accommodates the first induction heating unit, the second induction heating unit, the first temperature measurement unit, and the second temperature measurement unit.

* * * * *